Patented May 3, 1932                                                               1,856,251

UNITED STATES PATENT OFFICE

WILLY O. HERRMANN AND HANS DEUTSCH, OF MUNICH, GERMANY, ASSIGNORS TO CONSORTIUM FÜR ELEKTROCHEMISCHE INDUSTRIE, OF MUNICH, GERMANY

PROCESS OF MANUFACTURE OF ORGANIC ACID ANHYDRIDES

No Drawing. Application filed April 9, 1928, Serial No. 268,794, and in Germany April 11, 1927.

We have found that vinylic esters may be transformed by heating with carboxylic acids into acid anhydrides and alhehyde. Preferably the components are heated in the presence of catalysts, which, when hydrolyzed under the conditions of the reaction, produced a mineral acid. Such catalysts are substances capable of decomposing paraldehyde to acetaldehyde especially all substances of acid reaction such as zincchloride, sodiumbisulfate, mercury sulfate, chlorine, sulfur chloride. Especially apt are strong acids for instance sulfuric acid, benzene sulfuric acid, sulfo acetic acid, phosphoric acid and the like. These catalysts may also be employed in combination with each other.

The aldehyde formed by the reaction is removed from the reaction mixture in a continuous or discontinuous way e. g. by distilling off or in any other manner.

A method of executing is leading the vapours of the reaction mixture over heated surfaces preferably using catalysts. This process may also be executed in a continuous way e. g., by continuous distilling off the aldehyde formed and leading back the unaltered reaction components in a circulating manner.

*Example I.*—In a vessel provided with a fractionating column a mixture of 344 parts of vinylic acetate, 240 parts of acetic acid and 2 parts of sulfuric acid are boiled. The aldehyde formed is removed by fractionating distillation during the reaction. The aldehyde formation being finished, the reaction mixture is distilled. The distillation product contains about 77% of acetic anhydride. From this product more than 95% of acetic anhydride is obtained by rectification besides unaltered vinylic acetate and secondary formed ethylidene-diacetate. The yield is very good.

The residue of fractionation contains ethylidene-diacetate and is used again in a following process and acts analogous to a mixture of acetic acid and vinylic acetate.

*Example II.*—According to Example I 473 parts of vinylic acetate and 296 parts of propionic acid are brought to reaction. The mixed anhydride of acetic and propionic acid is obtained with good yield.

*Example III.*—In an analogous way as in Example I 627 parts of vinylic butyrate and 352 parts of butyric acid are brought to reaction. Butyric anhydride is obtained with good yield.

When executing this process the vinylic ester may be fed into the hot organic acid according to the conversion, distilling off the aldehyde formed, or the acid may be fed into the heated vinylic ester. The catalyst is then added either to the acid or to the ester.

The reaction components may be used in stoichiometric proportions, but it is also allowed to use one or the other in excess.

The reaction according to this process may be influenced by known means such as diminishing or raising the pressure of working, working in a stream of indifferent gases or vapours. It may also be of advantage to add a solvent or diluent.

Another method of working in a continuous way is the following one. A mixture of vinylic ester, carboxylic acid and catalyst is fed into the fractionating column of a still. The heating of the still, the cooling of the dephlegmator and the speed of feeding is thus regulated that the aldehyde is continuously distilling off and the corresponding anhydride mixture is removed from the still.

What we claim is:

1. In the manufacture of organic acid anhydrides by boiling a mixture of a vinyl ester of an aliphatic mono-carboxylic acid and an aliphatic monocarboxylic acid in the presence of a catalyst which, when hydrolyzed under the conditions of the reaction, produces a mineral acid, the step of immediately distilling off the resulting aldehyde continuously with its formation as soon as the ester-acid mixture begins to boil.

2. In the manufacture of organic acid anhydrides by boiling a mixture of a vinyl ester of an aliphatic mono-carboxylic acid and an aliphatic mono-carboxylic acid in the presence of sulphuric acid, the step of immediately distilling off the resulting aldehyde continuously with its formation as soon as the ester-acid mixture begins to boil.

3. In the manufacture of organic acid anhydrides by boiling a mixture of a vinyl ester of an aliphatic mono-carboxylic acid and an aliphatic mono-carboxylic acid in the presence of a catalyst which, when hydrolyzed under the conditions of the reaction, produces a mineral acid, the step of employing an excess of vinyl ester and distilling off the resulting aldehyde continuously with its formation as soon as the ester-acid mixture begins to boil.

4. In the manufacture of acetic anhydride by boiling a mixture of vinyl acetate with acetic acid in the presence of a catalyst which, when hydrolyzed under the conditions of the reaction, produces a mineral acid, the step of immediately distilling off the resulting acetaldehyde continuously with its formation as soon as the acetate-acid mixture begins to boil.

5. In the manufacture of acetic anhydride by boiling a mixture of vinyl acetate with acetic acid in the presence of sulphuric acid, the step of immediately distilling off the resulting acetaldehyde continuously with its formation as soon as the acetate-acid mixture begins to boil.

WILLY O. HERRMANN.
HANS DEUTSCH.